UNITED STATES PATENT OFFICE.

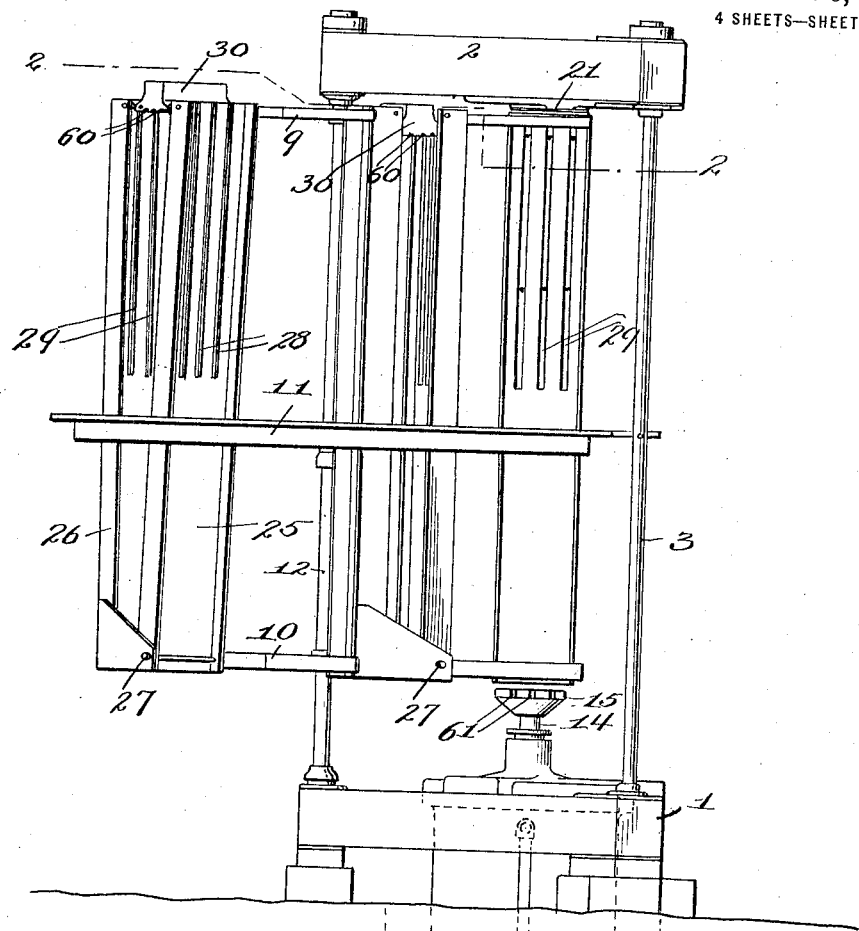

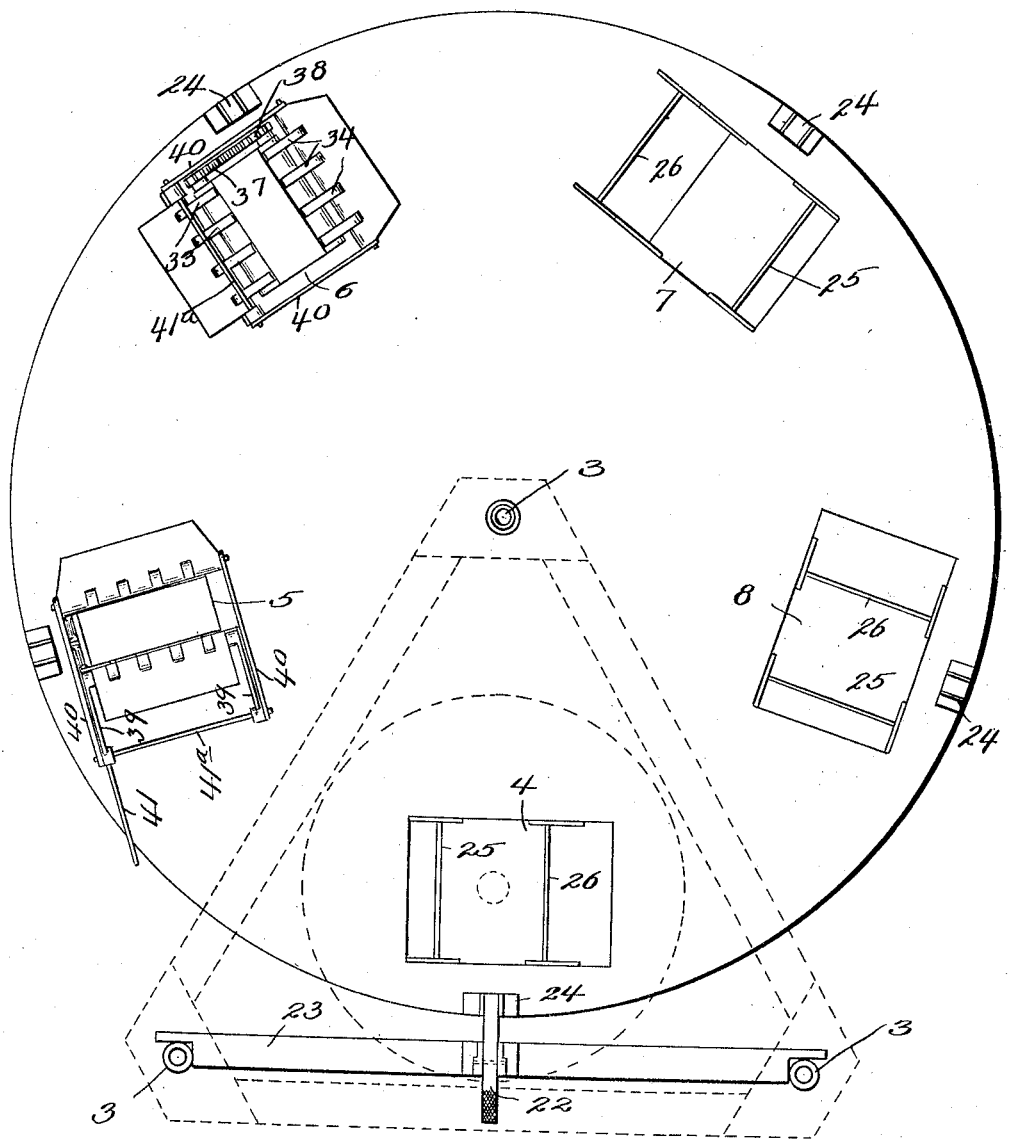

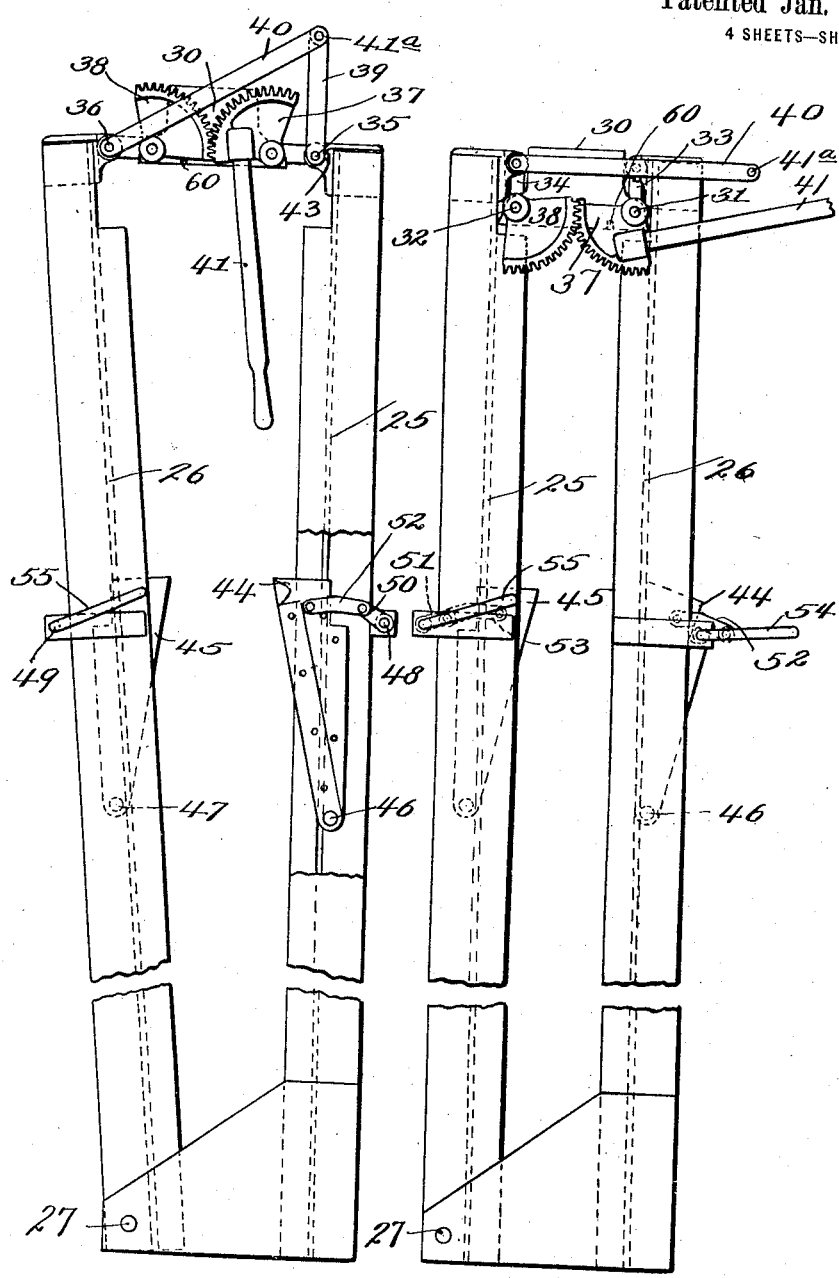

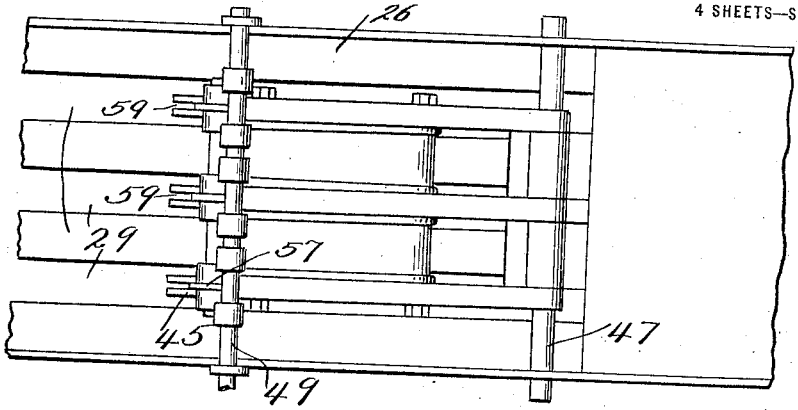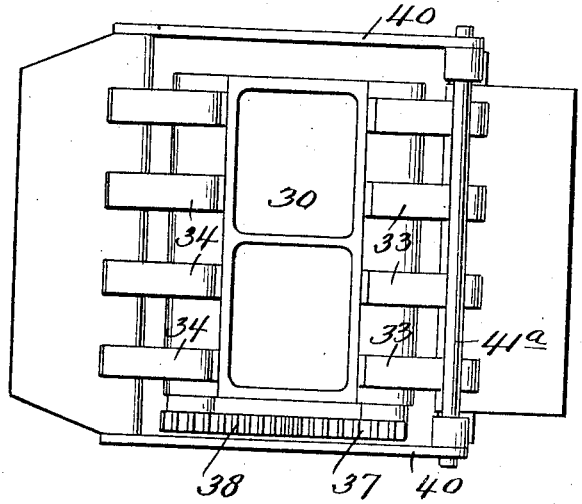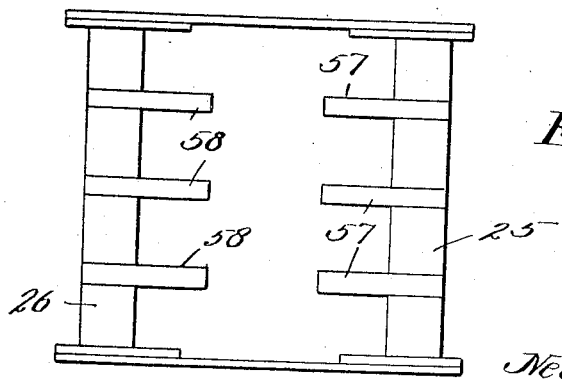

NELSON B. HENRY, OF ATLANTA, GEORGIA, ASSIGNOR, BY MESNE ASSIGNMENTS, TO MRS. MOLLIE H. MILLER, OF ATLANTA, GEORGIA.

COMPRESS.

1,327,472.      Specification of Letters Patent.      Patented Jan. 6, 1920.

Application filed April 24, 1916. Serial No. 93,290.

*To all whom it may concern:*

Be it known that I, NELSON B. HENRY, a citizen of the United States, residing at Atlanta, in the county of Fulton and State of Georgia, have invented new and useful Improvements in Compresses, of which the following is a specification.

My present invention relates to improvements in the art of compressing hay or other fibrous materials into bales. The invention comprehends improvements in this art whereby the material may be compressed into an extremely dense body or bale of minimum bulk, thereby diminishing greatly the space necessary for the shipment or storage thereof, and the compressing operation, and the tying and other sequential operations of the cycle necessary to the making up of the bale are performed concurrently and the cycles of operations may be performed in rapid succession, the compress in consequence having a greatly increased capacity as compared with compresses as heretofore constructed and operated.

The present invention is particularly adapted for use in subjecting bales of hay or other fibrous material as usually compressed to a further and relatively high compression which greatly increases the density and correspondingly decreases the bulk for a given weight of material, to the end that the space required in shipment and in consequence the cost of shipment are greatly reduced.

Compresses embodying the present invention have a capacity for handling a great quantity of material owing to the rapidity with which the sequential operations are performed, and particularly because the tying of the bale after compression thereof does not delay the next succeeding compressing operation for the following bale, the compressed bale being moved away from the compressing station and held under compression to permit tying thereof by means independent of the compressing means, with the advantage that one or more bales may be subjected to the compressing operation during the period of time required for the tying of the preceding bale. Furthermore, according to the present invention, the finished bale may be removed from one press chamber while a load or charge is being made up in another press chamber, and these two operations may be performed concurrently with the compressing and tying operations upon other bales.

Apparatus for carrying out the invention comprises a plurality of press chambers and a compression device adapted to coöperate successively with the charges in the press chambers, there being provided a compressing station, one or more bale-tying stations, a bale ejecting station, and a loading or filling station, the apparatus being so constructed and operated that the different operations may be performed concurrently at the various stations. The apparatus preferably embodies press chambers of improved construction whereby the compressed bale is positively held under compression, independently of the compressing means, until the tying operation has been completed, and the chamber is expansible to enable the finished bale to be easily and quickly removed therefrom.

In the accompanying drawings, wherein one embodiment of a compress capable of carrying out the present invention is shown—

Figure 1 is an elevation of the compress.

Fig. 2 represents a transverse section on the line 2—2 of Fig. 1.

Figs. 3 and 4 are longitudinal views of one of the press chambers.

Fig. 5 is a detail view of a portion of one of the press chambers showing a part of the means for holding the bale under compression.

Fig. 6 is a view of one of the press chambers looking toward the top in Fig. 3.

Fig. 7 shows the end of one of the press chambers as viewed from the bottom in Fig. 3.

Similar parts are designated by the same reference characters in the several views.

The present invention is applicable generally to the compression of various fibrous materials into bales or relatively dense or compact bodies, it being particularly applicable to the compression of such materials into bales which are bound by tie wires to maintain them in their dense, compact form. The primary feature of the invention consists in providing a plurality of press chambers which afford separate stations at which the compressing, tying, ejecting and loading operations may be performed in proper sequence and concurrently, the performance of these sequential operations concurrently reducing materially the period of time requisite for the production of the bale. Another feature of the invention consists in providing a press chamber of novel construction which contributes materially to the speed and facility of operation of the apparatus. While the preferred embodiment of the invention is shown in the accompanying drawings and will be hereinafter described in detail, it is to be understood that the invention is not restricted to the particular construction shown, as equivalent constructions are contemplated and will be included within the scope of the claims.

In the present instance, the compress adapted to carry out the invention comprises a suitable frame composed of a relatively heavy base 1, a relatively heavy head 2, and a suitable number of tension rods 3 which rigidly connect the base and head and maintain them in fixed relation. Preferably, and as shown, the base and head are of a generally triangular form and the tension rods connect the corners thereof. A carrier is provided which supports press chambers of a number corresponding to the number of stations it is desired to employ. In the present instance, five press chambers are shown, the press chamber 4 in Fig. 2 being shown at the compressing station, the press chambers 5 and 6 being shown at stations where the tying of the bale may be effected, the press chamber 7 is shown at the bale-ejecting station, and the press chamber 8 is shown at the station where the material to make up the bale is loaded or introduced. These press chambers may be supported in any suitable manner that will enable them to be brought successively into the different stations. Preferably, they are arranged vertically and they are mounted on a carrier which is revoluble on a vertical axis. The carrier shown comprises upper and lower heads 9 and 10 respectively and an intermediate head 11, these heads having the different press chambers mounted in circumferentially spaced relation thereon, and a bearing sleeve 12 connects the heads of the carrier and is revoluble about one of the tension rods of the frame as an axis.

In the construction just described, rotation of the carrier step-by-step will bring the press chambers successively into the compressing position which, as shown, is in a line between the base and the head of the frame. Any suitable means may be provided for effecting compression of the material in the press chamber to the desired extent. Preferably, and as shown, a hydraulic cylinder 13 is employed, this cylinder being mounted or supported on the base 1 and having its piston rod 14 provided with a foot 15 which is so arranged that it will reciprocate longitudinally in each press chamber as the latter is brought to the compressing station. Any suitable means may be provided for controlling the upward movement of the compressing foot to compress the charge and the downward movement of the foot to retract it from the chamber after compression of the charge therein has been completed. As shown, the pipe 16 supplies water or other motive fluid under suitable pressure to a four-way valve 17 which latter may be manipulated manually, a pipe 18 leading from the valve to the lower end of the cylinder and another pipe 19 leading from the valve to the upper end of the cylinder, 20 designating a discharge pipe leading from the valve and through which water or fluid may, by manipulation of the valve, be exhausted from one end of the cylinder while motive fluid is being admitted to the other end of the cylinder. The head 2 is provided with a rigid abutment 21, the purpose of which will be hereinafter described.

Any suitable means may be provided for positioning and holding the carrier in its different successive positions. As shown, a treadle 22 is pivoted on a cross-bar 23 mounted on the frame, and the end of this treadle is adapted to engage one or another of the notch-shaped stops 24 on the intermediate head 11 of the carrier, these stops corresponding in number and position to the different stations employed.

The press chambers provided by the present invention each comprise a member 25 which is fixed relatively to the heads of the carrier, and a member 26 which is so mounted that it may move in a direction toward and from the member 25. As shown, the lower end of the member 26 is pivoted at 27 and its upper portion may swing either into a position in parallelism with the member 25, or it may be swung outwardly at a divergent angle relatively to the member 25. The two members composing the sides of the press chamber are preferably made of angle iron in order that they may have the requisite rigidity and they are formed with a suitable number of longitudinal slots 28 and 29 to permit application of the tie wires to the compressed bale. Means is provided for locking the members 25 and 26 of the press chamber in parallelism, this being the relation of these members during the compressing and tying operations, and for relatively separating the members to permit removal of the finished bale and subsequent loading of the next charge which is to be compressed. Preferably, and as shown, means is also provided for moving the head of the press chamber in a direction longitudinally thereof, it sustaining the force of compression of the material when in one position and moving outwardly to release the bale when the latter is finished. In the construction shown, the head 30 of the press chamber is provided at opposite sides with a pair of shafts 31 and 32, these shafts being journaled in lugs formed at the sides of the head, and arms 33 and 34 are fixed to the respective shafts. The outer ends of these arms are pivoted on shafts 35 and 36, the latter shafts being secured to the upper ends of the side members 26 and 25, respectively, of the press chamber. A pair of gear segments 37 and 38 are provided, these gear segments coöperating with one another and being fixed to the shafts 31 and 32, respectively. A pair of links 39 and 40 are also provided, these links being connected to one another at 41ª, the opposite end of the link 39 being pivotally connected to the shaft 35 while the opposite end of the link 40 is pivotally connected to the shaft 36. A pair of these links 39 and 40 is preferably provided at each side of the press chamber, as shown in Fig. 6. An operating lever 41 is provided for actuating the gear segments 37 and 38, and the coöperating parts of this lever, as shown, are attached to the gear segment 37. In operation, the side members 25 and 26 are in relatively closed or parallel relation when the parts occupy the position shown in Fig. 3. At this time, the head 30 of the press chamber occupies its inner position and it is locked in this position so as to sustain the compression upon the bale by the arms 33 and 34 which at this time are in line, or substantially so, with the shafts 31 and 35 and 32 and 36, respectively. The side members 25 and 26 are locked in their closed or parallel relation by the links 39 and 40 at opposite sides of the press chamber, the pivotal points 35, 36 and 41ª of each pair of links being at this time in alinement or on dead center, as appears in Fig. 3. After the material has been compressed into a bale and the bale has been tied, the head 30 is swung upwardly and the side members 25 and 26 of the press chamber are expanded or swung open, as shown in Fig. 4. The movement of the head 30 and the spreading apart of the side members 25 and 26 are effected simultaneously by lifting the toggles, thus unlocking them. The expansive tendency of the compressed bale will then act to spread apart the side members 25 and 26 and to push upwardly the head 30, thereby completing the swing of the links 39 and 40 into the position shown in Fig. 4, and these same forces will cause the gear segments 37 and 38 to oscillate into the position shown in Fig. 4 where the head 30 is raised and the side members are spread apart. The links 39 and 40 operate as toggles to lock the side members of the press chamber in closed position during the compression of the material and to maintain these side members in locked position until after the bale has been tied. A lateral projection 43 on the toggle link 39 coöperates with the other toggle link 40, when the press chamber is closed, to prevent overthrow of the links 39 and 40 past the dead center.

According to the present invention, means is provided for maintaining the bale under compression after it has been compressed by the compressing means, and the means for maintaining the compression of the bale is independent of the compressing means. Preferably, and as shown, a suitable number of dogs 44 are provided in the side members 25 and another set of dogs is provided for the member 26. These dogs are mounted to operate through the longitudinal slots 28 and 29 in these respective members and they are pivoted to swing inwardly and outwardly on the shafts 46 and 47, respectively. Any suitable means may be provided for swinging these dogs into and out of the press chamber. As shown, shafts 48 and 49 are provided having cranks 50 and 51 fixed thereon, and these cranks are connected by the links 52 and 53 to the respective dogs 44 and 45. Operating handles 54 and 55 are fixed to the shafts 48 and 49, respectively. By swinging the levers 54 and 55 inwardly, the dogs are swung inwardly to positions within the press chamber, and reverse movements of the levers just mentioned withdraw the dogs from the press chamber. The lower end of each press chamber is provided with inwardly projecting fingers or bars 57 and 58 to prevent dropping of the material from the bottom of the press chamber when the same is loaded. The upper ends of the dogs are provided with slots 59, and the inner face of the head 30 is formed with grooves 60 to permit tie wires to be passed around the bale while the same is held under compression. The upper end of the head 30 of each press chamber is arranged to assume a position directly in line with the abutment 21 on the head 2 when the respective press chamber is brought into the compressing position. In order that the foot 15 of the compression device may pass the fingers 57 and 58 at the bottom of each press chamber and also the dogs 44 and 45, the foot is formed with recesses or notches 61 which are positioned according to the positioning of these fingers and dogs.

The mode of operation of the compress as a whole may be briefly described as follows:—Starting with the press chamber 8, which is at the filling or loading station, the material is introduced into this press chamber and the carrier is then rotated one step, bringing this loaded press chamber into the compressing position. At this time, the side members and the head of the press chamber are locked in the condition shown in Fig. 3. The compression is effected by reciprocation of the foot 15 which rises in the press chamber and in a single stroke compresses the material in the upper portion thereof. The foot 15 in its compressing stroke moves slightly past the dogs 44 and 45. When the compression has been effected, these dogs are swung into the press chamber from opposite sides thereof, assuming positions beneath the compressed bale. The foot 15 is then retracted entirely from the press chamber, the dogs maintaining the bale in its compressed condition without depending upon the compressing means. The carrier is then rotated another step, thus bringing the press chamber containing the confined and compressed bale to the station where the bale is tied. If necessary, the tying operation may be effected at either one or two stations in the rotation of the carrier. Tying of the bale is effected while the bale is held under compression by the dogs. Tie wires of the usual kind may be employed, these wires being passed around the bale through the slots in the opposite sides of the press chamber and through the slots or grooves in the dogs and the head 30. After the bale has been tied, the dogs may be retracted and the sides and head of the press chamber may be unlocked and permitted to open and expand. The next step in the rotation of the carrier brings the press chamber to the ejecting position where the finished bale is removed, and the following step in the rotation of the carrier brings the chamber in position for loading. This sequence of operations is carried out in the making up of each bale, but owing to the number of press chambers provided, the sequential operations, which include the filling of the press chamber, the compression of the material into a bale, the tying of the bale, and the ejecting of the finished bale, are performed concurrently, with the result that the capacity of the compress is greatly increased. Moreover, by providing each press chamber with means for maintaining the bale therein under compression, independent of the compressing means, and shifting the compressed bale out of the compressing position, the bale-tying operation is performed while the next succeeding compression operation is being effected, thereby avoiding delay, and also, the press chamber containing the bale to be tied is brought into a position where it is more easily accessible for tying. During the compression of the charge in each press chamber, the end thrust exerted on the particular press chamber at the compressing station is sustained by the abutment 21 of the head 2, said abutment coöperating with the head 30 of the press chamber; but after the compressed material is held under compression by the dogs, the end thrust on the press chamber is relieved, the head 30 no longer presses against the abutment 21, and the expansive tendency of the compressed bale is sustained entirely by the particular press chamber which contains it.

I claim—

1. A compress comprising a press chamber having sides which are movably connected at one end, means coöperative with the opposite ends of said sides for relatively moving them inwardly and for locking them in such position, means having a single operative stroke for compressing a charge of material longitudinally within the press chamber, the press chamber and said compressing means being relatively shiftable into and out of coöperative relation, and means located intermediately of the length of the press chamber for maintaining the material under compression therein after the press chamber and said compressing means have been shifted relatively out of coöperative relation.

2. A compress comprising a plurality of press chambers each having a head at one end and relatively movable sides, means operatively connecting said head and sides for causing them to move concurrently inwardly and outwardly relatively to the press chamber, means having a single operative stroke and adapted to operate successively upon charges of material in said chambers to compress the same while said head and sides occupy their inner positions, and means for maintaining each charge under compression independently of said compressing means.

3. A compress comprising a press chamber and a charge compressing device having a single operative stroke within said chamber, the latter and said device being relatively shiftable to and from coöperative position, the press chamber comprising laterally movable sides, a longitudinally movable compression sustaining head, means for releasably holding said sides and head in their inner positions wherein they coöperate with said compression device, and means coöperative with said sides and head for maintaining a charge in said chamber under compression independently of said compressing device and preparatory to the tying of the charge.

4. A compress comprising a frame, a compressing device coöperative therewith, a press chamber movable relatively to the frame to shift the chamber to and from operative relation with the compressing device and comprising a compression sustaining head movable longitudinally of the press chamber, means on the frame for sustaining the thrust of compression exerted on said head during operation of the compressing device, and means carried by the press chamber for maintaining a charge therein under both longitudinal and transverse compression independently of said compressing device.

5. A compress comprising a plurality of press chambers each embodying side members capable of being closed and expanded laterally, and a head movable longitudinally of the chamber, a device operative to successively compress charges contained in said chambers, and means connecting said side members and head for locking the side members of each chamber in closed position and the head in its inner position during compression of the charge therein and for subsequently expanding said side members and head preparatory to ejection of the compressed charge.

6. In a compress, a press chamber embodying side members relatively movable laterally, and a compression sustaining head movable longitudinally of the press chamber, and means operative to concurrently move said head and side members relatively inwardly into compression sustaining position and to lock the head and side members in such relation.

7. In a compress, a press chamber embodying side members relatively movable laterally of the chamber, a head movable longitudinally of the chamber, and means connecting said head and side members and operative to lock said members and head in fixed relation and also operative to relatively move the side members laterally and to move the head longitudinally of the chamber.

In testimony whereof I have hereunto set my hand in presence of two subscribing witnesses.

NELSON B. HENRY.

Witnesses:
CHAS. F. SEEGER,
S. D. TROWBRIDGE.